(12) United States Patent
Ishii et al.

(10) Patent No.: US 6,779,540 B2
(45) Date of Patent: Aug. 24, 2004

(54) CORRECTIVE CONTROL SYSTEM AND METHOD FOR LIQUID PRESSURE CONTROL APPARATUS IN AUTOMATIC TRANSMISSION

(75) Inventors: Shigeru Ishii, Kanagawa (JP); Masashi Suguichi, Yokohama (JP); Tatsuaki Eguchi, Kanagawa (JP); Hisao Nobu, Kanagawa (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 10/400,394

(22) Filed: Mar. 28, 2003

(65) Prior Publication Data

US 2003/0183280 A1 Oct. 2, 2003

(30) Foreign Application Priority Data

Mar. 29, 2002 (JP) ........................................ 2002-096394

(51) Int. Cl.$^7$ ........................ F16K 31/06; G05D 16/20; F16H 61/02
(52) U.S. Cl. ........................ 137/14; 137/487.5; 701/51
(58) Field of Search ................................ 137/14, 487.5; 701/51

(56) References Cited

U.S. PATENT DOCUMENTS 5,857,755 A  *  1/1999  Aoki et al. ................. 303/152
2003/0187562 A1  10/2003  Ishii et al.

FOREIGN PATENT DOCUMENTS

| EP | 1 014 247 | * | 6/2000 |
| JP | 2000039059 A | * | 2/2000 |
| JP | 2001-116130 A | | 4/2001 |

* cited by examiner

Primary Examiner—Ramesh Krishnamurthy
(74) Attorney, Agent, or Firm—Foley & Lardner LLP

(57) ABSTRACT

In corrective control system and method for a liquid pressure control apparatus for a control valve unit, fundamental maps are preset on the basis of a hysteresis characteristic, the hysterisis characteristic being exhibited in such a manner that an output liquid pressure actually measured value which takes along a first hysterisis loop when the current value is increased toward a larger value is different from that which takes along a second hysterisis loop when the current value is, in turn, decreased toward a smaller value from the larger value and the fundamental maps uses a relationship on a derived first-order function at a lower output pressure side than a linear region of the hysterisis characteristic.

10 Claims, 6 Drawing Sheets

FUNDAMENTAL MAP

CORRECTIVE CONTROL SYSTEM AND METHOD FOR LIQUID PRESSURE CONTROL APPARATUS IN AUTOMATIC TRANSMISSION

BACKGROUND OF THE INVENTION

1. Field of the Invention

The present invention relates generally to corrective control system and method for a liquid pressure control apparatus in, for example, a vehicular automatic transmission which accurately control an output liquid pressure in accordance with a value of an electrical signal and, more particularly, relates to the corrective control system and method which control correctively the output liquid pressure of a control valve unit equipped within the vehicular automatic transmission.

2. Description of the Related Art

In the control valve unit of the vehicular automatic transmission, the electrical signal is used to drive a solenoid so as to produce a signal pressure in accordance with the electrical signal. This signal pressure is used to make a gear shift by controlling a clutch pressure of a frictional element which is the output liquid pressure and a line pressure which is an original pressure of the clutch pressure of the frictional element. At this time, due to a variation in a circuit resistance and a difference in performance between the individual products of frictional elements and solenoids, a relationship between the electrical signal for driving the solenoid and the output liquid pressure cannot accurately be obtained. Both of a shift shock and a response delay in the gear shift easily occur. Thus, desired action and advantages cannot accurately be obtained.

A Japanese Patent Application First Publication No. 2001-116130 published on Apr. 27, 2001 exemplifies a previously proposed corrective control system for a liquid pressure control apparatus in which an actual relationship between the electrical signal for the drive of the solenoid and the output liquid pressure due to the variation in the circuit resistance and difference in performance between individual products of frictional elements and solenoids is compared with each of a plurality of prepared maps having various characteristics. By selecting one of the maps which is least deviation from the actual relationship, an accuracy in the relationship between the solenoid drive electrical signal and the output liquid pressure is improved and an improvement in a controllability can be achieved. Specifically, the actual output pressures with respect to the electrical signals at a plurality of points preset are measured. Thereafter, with a lateral axis as output values on the map and with a longitudinal axis as an actual output liquid pressure, the actual output liquid pressures are plotted. The plotted values are approximated to a first-order function through a least square method. This approximated first-order function has a gradient (gain) and a constant term (offset). These gradient value and constant term are stored. Then, during an actual control procedure, a target output liquid pressure is substituted into the longitudinal axis to calculate an instantaneous map output (liquid) pressure from the stored gain and offset values.

FIG. 7 shows a structure for creating the output liquid pressure which is the clutching pressure of a certain frictional element (or brake) of the automatic transmission from the signal pressure that a solenoid outputs. The previously proposed liquid pressure control apparatus includes: a solenoid valve 40 which creates a spool pilot pressure $P_{S\text{-}PLT}$ from a pilot pressure $P_{PLT}$ and a spool valve 50 outputting a liquid supply pressure P for the frictional element or the brake from line pressure PL which is the spool supply pressure according to the spool pilot pressure $P_{S\text{-}PLT}$. In solenoid valve 40, a movement quantity of a plunger 42 is increased in accordance with a supply current value. A spherical ball 43 is moved which, for example, interrupts pilot pressure $P_{PLT}$ and spool pilot pressure $P_{S\text{-}PLT}$ so that a flow passage 44 is opened. Then, pilot pressure $P_{PLT}$ is communicated with spool pilot pressure $P_{S\text{-}PLT}$ so that a spool pilot pressure $P_{S\text{-}PLT}$ is increased. On the other hand, in spool valve 50, a spool supply pressure (line pressure valve) is communicated with a frictional element. This spool 51 is moved together with a pressure increase in spool pilot pressure $P_{S\text{-}PLT}$ opposed against spool spring 52 and the flow passage is closed so that line pressure PL which is the spool supply pressure reduces the frictional element supplying pressure. Hence, when a current value caused to flow through solenoid valve 40 is large, spool pilot pressure $P_{S\text{-}PLT}$ and frictional element supplying pressure P is decreased linearly.

In the case of the solenoid valve described above, an output (liquid) pressure characteristic is exhibited which is different from spool pilot pressure $P_{S\text{-}PLT}$ which is an output (liquid) pressure of the solenoid due to the characteristic of a spool spring 52. FIG. 6 shows characteristic graphs representing a static characteristic of the relationship between the drive current to the solenoid and output liquid pressure. As shown in FIG. 6, a, so-called, hysterisis characteristic is exhibited between the drive current and the output liquid pressure. Hence, the prepared map is used which is an average output liquid pressure value at each of the same current values from a static characteristic as denoted by a thin dot line shown in FIG. 6.

SUMMARY OF THE INVENTION

However, at an average output pressure map for each of the respective same current values, a deviation from an actual output liquid pressure characteristic occurs. Consequently, a worsening of a controllability will be introduced.

Especially, in the hysterisis characteristic shown in FIG. 6, an output pressure zero point in a first hysterisis loop along which the output pressure value is decreased as the current value is increased, is separated from that in a second hysterisis loop along which the output pressure is increased as the current value is decreased. In this case of characteristic, if the output liquid pressure average value is used, a large influence of the second hysterisis is received in a low hydraulic pressure region. For example, if the current value is once raised and, in the midway through the increase in the current value, the current value is decreased, the output liquid pressure is lowered following the first hysterisis loop of the hysterisis which is a static characteristic of actual output pressure and, thereafter, when the current is lowered, the actual output pressure does not follow the second hysterisis loop but takes a value shifted toward a lower pressure side. Such a phenomenon as described above becomes remarkable when the output liquid pressure is, at one stroke, reduced in accordance with the increase in current value and the output liquid pressure is, at one stroke, increased in accordance with the increase in the output pressure It is, hence, an object of the present invention to provide corrective control system and method for a liquid pressure control apparatus which are capable of improving the controllability even if a large hysterisis occurs between the electrical signal and output pressure due to a variation in the liquid pressure circuit and solenoid.

The above-described object can be achieved by providing a corrective control system for a liquid pressure control apparatus of a control valve unit, comprising: a liquid pressure controlling section that controls an output liquid pressure of the control valve unit on the basis of a current value which is an electrical signal generated in accordance with an output pressure demand value P* determined according to a calculation process executed within a control unit; an output liquid pressure actually measuring section that outputs respectively separated current values to a solenoid drive circuit of the control valve unit and actually measures the output liquid pressure values for the outputted respective current values; an output pressure theoretical value calculating section that calculates an output liquid pressure theoretical value for each of the current values outputted by the actually measuring section by referring to preset fundamental maps, each fundamental map representing a relationship between the current value and the output liquid pressure theoretical value; a corrective term calculating section that approximates a relationship between the output liquid pressure actually measured value and the output liquid pressure theoretical value for each of the same current values to a first-order function and calculates a coefficient of the approximated first-order function and a constant thereof; a storing section that stores the calculated coefficient and constant therein; and a correcting section that corrects the electrical signal which accords with the output liquid pressure demand value on the basis of the coefficient and constant stored in the storing section; a fundamental map presetting section that presets the fundamental maps on the basis of a hysterisis characteristic that each individual control valve unit has, the hysterisis characteristic being exhibited in such a manner that the output liquid pressure actually measured value which follows along a first hysterisis loop when the current value is increased toward a larger value is different from that which follows along a second hysterisis loop when the current value is, in turn, decreased toward a smaller value from the larger value; a linear point setting section that calculates the current average values between the current values in the first hysterisis loop and those in the second hysterisis loop which correspond to at least two output liquid pressure actually measured values and sets linear points determined from the output liquid pressure actually measured value and the current average value which corresponds to the two output liquid pressure actually measured values in a linear region of the hysterisis characteristic; and a linearity characteristic deriving section that derives a first-order function that passes through the set two linear points, and wherein the fundamental map presetting section presets the fundamental maps using the relationship between the output liquid pressure actually measured value and the current average value and using the relationship on the derived first-order function at a lower output pressure side than the linear region.

The above-described object can also be achieved by providing a corrective control system for a liquid pressure control apparatus for a control valve unit, comprising: a corrective control system for a liquid pressure control apparatus of a control valve unit, comprising: a liquid pressure controlling section that controls an output liquid pressure of the control valve unit on the basis of a current value which is an electrical signal generated in accordance with an output pressure demand value P* determined according to a calculation process executed within a control unit; an output liquid pressure actually measuring section that outputs respectively separated current values to a solenoid drive circuit of the control valve unit and actually measures the output liquid pressure values for the outputted respective current values; an output pressure theoretical value calculating section that calculates an output liquid pressure theoretical value for each of the current values outputted by the actually measuring section by referring to preset fundamental maps, each fundamental map representing a relationship between the current value and the output liquid pressure theoretical value; a corrective term calculating section that approximates a relationship between the output liquid pressure actually measured value and the output liquid pressure theoretical value for each of the same current values to a first-order function and calculates a coefficient of the approximated first-order function and a constant thereof; a storing section that stores the calculated coefficient and constant therein; and a correcting section that corrects the electrical signal which accords with the output liquid pressure demand value on the basis of the coefficient and constant stored in the storing section; a fundamental map presetting section that presets and stores the fundamental maps therein on the basis of a hysteresis characteristic that each individual control valve unit has, the hysterisis characteristic being exhibited in such a manner that the output liquid pressure actually measured value which follows along a first hysterisis loop when the current value is increased toward a larger value is different from that which follows along a second hysterisis loop when the current value is, in turn, decreased toward a smaller value from the larger value; a linear point setting section that calculates the current average values between the current values in the first hysteresis loop and those in the second hysterisis loop which respectively correspond to present plurality of the output pressure actually measured values and sets linear points determined from the output liquid pressure actually measured values and the current average values, from the hysterisis characteristic; a linearity characteristic deriving section that derives a first-order function passing through the set two or more linear points; and a virtual point setting section that calculates a virtual current value by substituting a preset virtual output liquid pressure equal to or below zero into the first-order function derived by the linearity characteristic deriving section and sets a virtual point determined from the virtual output liquid pressure and virtual current value, wherein, at a higher output liquid pressure region including the linear characteristic region of the hysterisis characteristic, each point is set by the point setting section and, at a lower output liquid pressure region than the linear characteristic region of the hysterisis characteristic, the point is set by the virtual point setting section, and wherein the fundamental map presetting section presets the fundamental maps, each fundamental map being a map representing that a relationship that mutually adjacent points are approximated by a straight line.

The above-described object can also be achieved by providing a corrective control method for a liquid pressure control apparatus of a control valve unit, comprising: controlling an output liquid pressure of the control valve unit on the basis of a current value which is an electrical signal generated in accordance with an output pressure demand value P* determined according to a calculation process executed within a control unit; outputting respectively separated current values to a solenoid drive circuit of the control valve unit; actually measuring the output liquid pressure values for the outputted respective current values; calculating an output liquid pressure theoretical value for each of the outputted current values by referring to preset fundamental maps, each fundamental map representing a relationship between the current value and the output liquid pressure theoretical value; approximating a relationship between the output liquid pressure actually measured value and the output liquid pressure theoretical value for each of the same current values to a first-order function; calculating a coefficient of the approximated first-order function and a constant thereof; storing the calculated coefficient and constant therein; and correcting the electrical signal which accords with the output liquid pressure demand value on the basis of the stored coefficient and constant; presetting the fundamental maps on the basis of a hysterisis characteristic that each individual control valve unit has, the hysterisis characteristic being exhibited in such a manner that the output liquid pressure actually measured value which follows along a first hysterisis loop when the current value is increased toward a larger value is different from that which follows along a second hysterisis loop when the current value is, in turn, decreased toward a smaller value from the larger value; calculating the current average values between the current values in the first hysterisis loop and those in the second hysterisis loop which correspond to at least two output liquid pressure actually measured values; setting linear points determined from the output liquid pressure actually measured value and the current average value which corresponds to the two output liquid pressure actually measured values in a linear region of the hysterisis characteristic; and deriving a first-order function that passes through the set two linear points, and wherein the fundamental maps are preset using the relationship between the output liquid pressure actually measured value and the current average value and using the relationship on the derived first-order function at a lower output pressure side than the linear region.

The above-described object can also be achieved by providing a corrective control method for a liquid pressure control apparatus of a control valve unit, comprising: controlling an output liquid pressure of the control valve unit on the basis of a current value which is an electrical signal generated in accordance with an output pressure demand value P* determined according to a calculation process executed within a control unit; outputting respectively separated current values to a solenoid drive circuit of the control valve unit; actually measuring the output liquid pressure values for the outputted respective current values; calculating an output liquid pressure theoretical value for each of the outputted current values by referring to preset fundamental maps, each fundamental map representing a relationship between the current value and the output liquid pressure theoretical value; approximating a relationship between the output liquid pressure actually measured value and the output liquid pressure theoretical value for each of the same current values to a first-order function; calculating a coefficient of the approximated first-order function and a constant thereof; storing the calculated coefficient and constant therein; and correcting the electrical signal which accords with the output liquid pressure demand value on the basis of the stored coefficient and constant; presetting and storing the fundamental maps therein on the basis of a hysterisis characteristic that each individual control valve unit has, the hysterisis characteristic being exhibited in such a manner that the output liquid pressure actually measured value which follows along a first hysteresis loop when the current value is increased toward a larger value is different from that which follows along a second hysterisis loop when the current value is, in turn, decreased toward a smaller value from the larger value; calculating the current average values between the current values in the first hysteresis loop and those in the second hysteresis loop which respectively correspond to present plurality of the output pressure actually measured values and sets linear points determined from the output liquid pressure actually measured values and the current average values, from the hysterisis characteristic; deriving a first-order function passing through the set two or more linear points; and calculating a virtual current value by substituting a preset virtual output liquid pressure equal to or below zero into the derived first-order function; and seting a virtual point determined from the virtual output liquid pressure and virtual current value, and wherein, at a higher output liquid pressure region including the linear characteristic region of the hysteresis characteristic, each point is set at the point setting and, at a lower output liquid pressure region than the linear characteristic region of the hysteresis characteristic, the point is set at the virtual point setting, and wherein the fundamental map presetting section presets the fundamental maps, each fundamental map being a map representing that a relationship that mutually adjacent points are approximated by a straight line.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
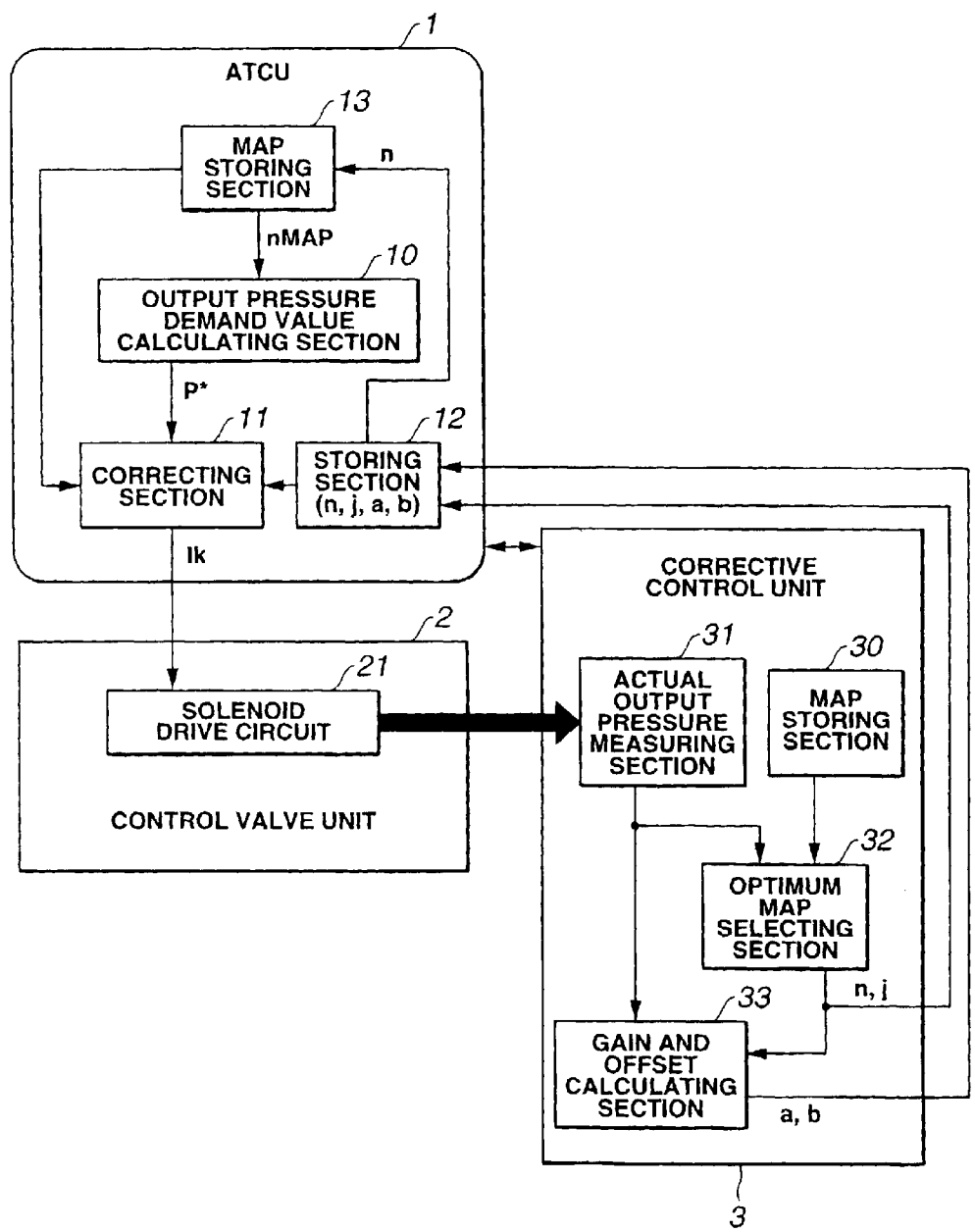
FIG. 1 is a functional block diagram of a corrective control unit communicated with an automatic transmission control unit supplying an electrical signal to a control valve unit of an automatic transmission to which a corrective control system in a first preferred embodiment according to the present invention is applicable.

FIG. 1 shows a whole functional block diagram of a corrective control system for a liquid pressure control apparatus of a control valve unit 2 in a preferred embodiment according to the present invention.

In FIG. 1, an automatic transmission control unit (ATCU) 1 which outputs a control current (current value Ik) to a control valve unit 2 (specifically, a solenoid drive circuit 21) of the automatic transmission. In addition, automatic transmission control unit (ATCU) 1 outputs a gear shift control command to the automatic transmission and includes: an output (liquid) pressure demand value calculating section 10; a correcting section 11; a storing section 12; and a map storing section 13.

Output (liquid) pressure demand value calculating section 10 inputs the information to perform a liquid pressure corrective control and calculates an output pressure demand value P* on the basis of the input information of ATCU 1. It is noted that output (liquid) pressure demand value calculating section 10 calculates and outputs the output (liquid) pressure demand value P* in accordance with a running state after the corrective control for the liquid pressure (as will be described later) has been carried out.

Storing section 12 stores the corrective information (n, j, a, b) as will be described later. It is noted that n and j denotes arbitrary integers. It is noted that, after the end of the corrective control, a fundamental map selected on the basis of a map information n outputted from storing section 12 to map storing section 13 is outputted to correcting section 11. The selected fundamental map is corrected on the basis of the corrective information outputted from storing section 13. Correcting section 11 calculates the current value I on the basis of output pressure demand value P* based on the corrected fundamental map (as will be described later) and outputs the calculated current value Ik to solenoid drive circuit 21.

The fundamental maps stored by map storing section 13 will herein be explained.

Figure 6:
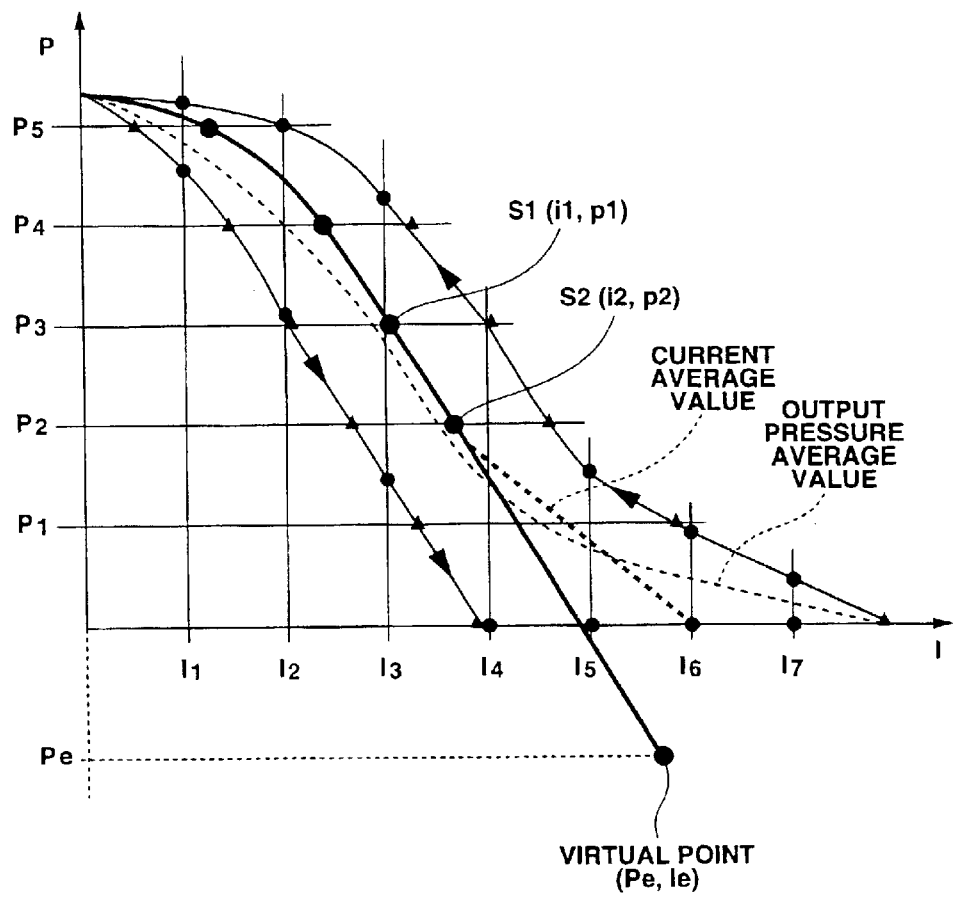
FIG. 6 is a hydraulic pressure plotted graph representing a relationship between an output (liquid) pressure and a current value in the first embodiment of the corrective control system shown in FIG. 1.
Figure 7:
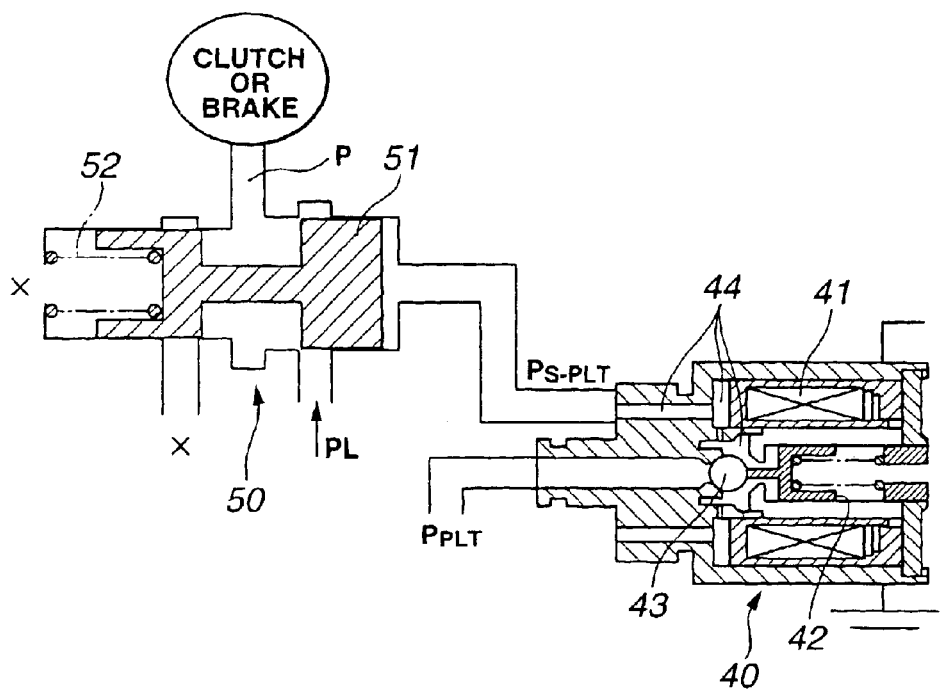
FIG. 7 is a rough view of a structure of a liquid pressure control apparatus for creating the output pressure which is a clutching pressure of a frictional element from a signal pressure outputted by an electromagnetic linear solenoid of the control valve unit to which the control system according to the present invention is applicable.

FIG. 6 shows a method of presetting the fundamental map in the above-described first embodiment as compared with the case of the previously proposed liquid pressure control apparatus described in the BACKGROUND OF THE INVENTION.

An output pressure P (or called an output liquid pressure but, hereinafter, also referred to the output pressure) is decreased along with a rise in current value I outputted to solenoid drive circuit 21 and output pressure P is raised along with the decrease in current value I. At this time, the decrease and increase in output pressure P have the hysterisis following different routes (first and second hysterisis loops). For example, as shown in FIG. 6, suppose that output liquid pressure P is lowered, at the stroke, due to the increase in current value I and an output liquid pressure zero point along an output pressure descending slope (first hysteresis loop) is separated from the output liquid pressure point along an output pressure ascending slope (second hysterisis loop). At this time, when the fundamental map is preset, current value rise side output pressure (output liquid pressure Pk along the first hysterisis loop) and current value lowered side pressure (output liquid pressure Pk along the second hysterisis loop) is measured for each of the same current values Ik and an average output pressure thereof is set to the fundamental map. Consequently, the fundamental map indicates a curved line denoted by a bold dot line shown in FIG. 6. In this case, a shaft of the output liquid pressure to a high output side is influenced at a low output pressure region. It is herein noted that points S1 (i1, p1) and S2 (i2, p2) determined from the current average value at the output liquid pressure actually measured values P3 and P2 at the linear region of the hysterisis loop characteristic are set. Then, a first-order function passing through the above-described set points P1 and P2 is introduced as follows:

$$(P-p1)=[(p2-p1)/(i2-i1)\cdot(I-i1)] \tag{1}$$

Substituting P=Pe having the negative value relationship to the relation of the first-order function to calculate Ie:Ie=i1+[(Pe−p1)·(i2−i1)]/(p2−p1)... (2). If this virtual point (Pe, Ie) is used, a linearity at the low output pressure region can be assured even if a case of such a characteristic that the output liquid pressure zero point of the output liquid pressure descending slope (first hysterisis loop) is separated considerably from that of the output liquid pressure ascending slope. Then, since such a characteristic as being very near to the characteristic of output liquid pressure P with respect to the actual current value I, the high controllability can be achieved.

It is noted that this fundamental map setting is preset by actually and already measuring the output liquid pressure values and the average current value using the plurality of solenoid valves to be used for control valve unit 2. At this time, as the data for the fundamental maps, average current values at preset plurality of output liquid pressures are stored as point data (I, P) and, furthermore, virtual points (Ie, Pe) are stored. Then, if data between each point data is requested, respective points are connected with a straight line so as to be approximate to the first-order function. The output liquid pressure P is inputted into the approximated first-order function to obtain the current value. Thus, it becomes possible to present the map characteristic with a high accuracy at a reduced memory capacity. Especially, the use of such a fundamental map structure as described above may be advantageous in the automatic transmission requiring a minute control in the low output pressure region.

Current I outputted from correcting section 11 serves to output the output pressure in accordance with current I via solenoid drive circuit 21 installed in control valve unit 2.

In FIG. 1, a corrective control unit 3 serves to perform the corrective control for the current value as will be described later. Corrective control unit 3 includes: a map storing section 30 having the same maps as stored in map storing section 13 within ATCU 1; an actual output pressure measuring section 31; an optimum map selecting section 32; and gain offset calculating section 33. Optimum map selecting section 32 receives a plurality of fundamental maps stored in map storing section 30. Actual output pressure measuring section 31 measures output liquid pressure outputted from solenoid drive circuit 21 and outputs the measured result to optimum map selecting section 32 and gain offset calculating section 33. Optimum map selecting section 32 compares the measured output pressure with the plurality of fundamental maps outputted from map storing section 30 to select an optimum fundamental map. It is noted that the details of the selection of the optimum map will be described later. Map information (n, j) selected by optimum map selecting section 32 is outputted to gain and offset calculating section 33 and stored into storing section 12 of ATCU 1. Gain and offset calculating section 33 calculates gain a and offset b, these being corrective terms, on the basis of the selected optimum map information and outputs the calculated gain a and offset b to storing section 12 of ATCY 1.

Figure 2:
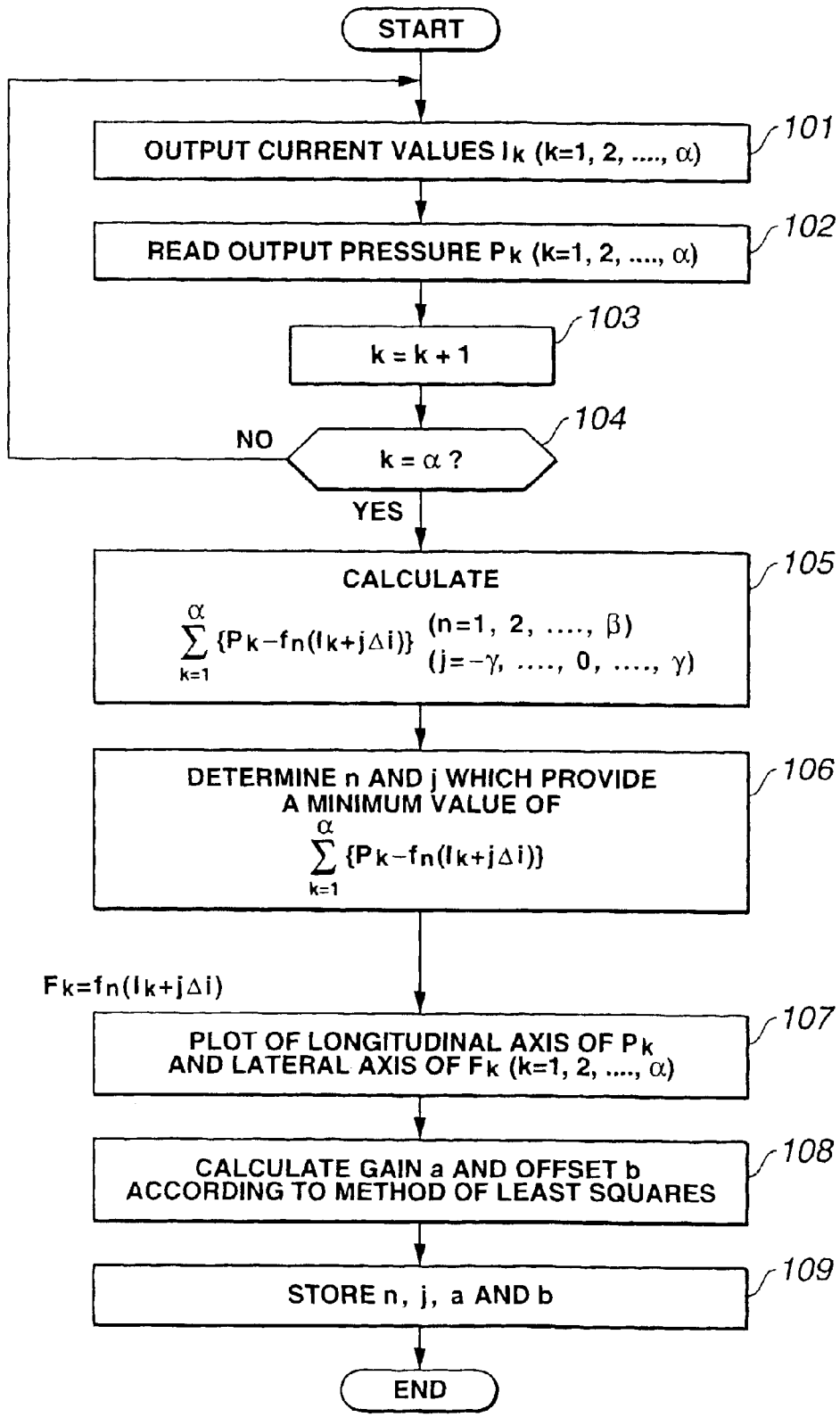
FIG. 2 is an operational flowchart for explaining an operation of the corrective control unit shown in FIG. 1 to obtain a corrective information.

Next, FIG. 2 shows an operational flowchart representing the control contents of corrective control unit 3 shown in FIG. 1.

That is to say, at a step 101, corrective control unit 3 outputs solenoid drive currents on the plurality of points Ik (k=1, 2, ..., α) (the values may mutually be separated at the same intervals) via automatic transmission control unit ATCU 1.

At a step 102, corrective control unit 3 reads the actual output pressure values Pk (k=1, 2, ..., α) with respect to respectively corresponding solenoid drive currents Ik. At a step 103, corrective control unit 3 increments a value of k (k=k+1) by one.

At a step 104, corrective control unit 3 determines whether k=α. If Yes at step 104 (k=α), the routine goes to a step 105. If No at step 104, the routine returns to step 101.

At step 105, corrective control unit 3 calculates a difference between actual output pressure value Pk when solenoid drive current Ik is caused to flow through solenoid drive circuit 21 and a map output value fn(Ik+jΔi) obtained from a plurality of maps and calculates a sum of the difference from k=1 to k=α: That is to say, $$\sum_{k=1}^{\alpha}\{Pk - f_n(I_k + j\Delta i)\},$$

wherein n=1, 2, ..., β and j=-γ, ..., 0, ..., γ, and wherein γ denotes an arbitrary integer and Δi denotes a minimum unit when the current value I is corrected.

At the nest step 106, corrective control unit 3 determines n and j which take minimum values of the value calculated at step 105

$$\left[\sum_{k=1}^{\alpha}\{Pk - f_n(I_k + j\Delta i)\}\right].$$

Figure 4:
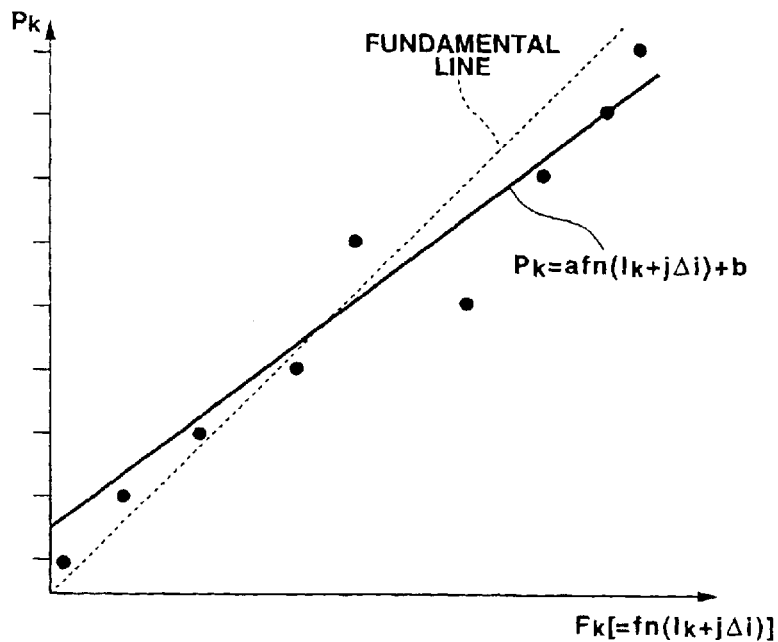
FIG. 4 is a plotted graph of output pressure actually measured value for calculating a gain value and an offset value using a least square method.

At a step 107, corrective control unit 3 performs a plotting of the output pressure values with Pk as a longitudinal axis and with Fk (=fn(Ik+jΔi)) as a lateral axis, as shown in FIG. 4.

At a step 108, corrective control unit 3 approximates the plotted points described above to a first-order function through a least square method to calculate gain a and offset b.

At a step 109, corrective control unit 3 stores values of n, j, a, and b into a memory thereof.

In details, at steps 101 through 104, corrective control unit 3 stores actually measured pressure values Pk (k=1 through α) in accordance with respectively corresponding predetermined plurality of current values Ik (k=1 through α).

Figure 3:
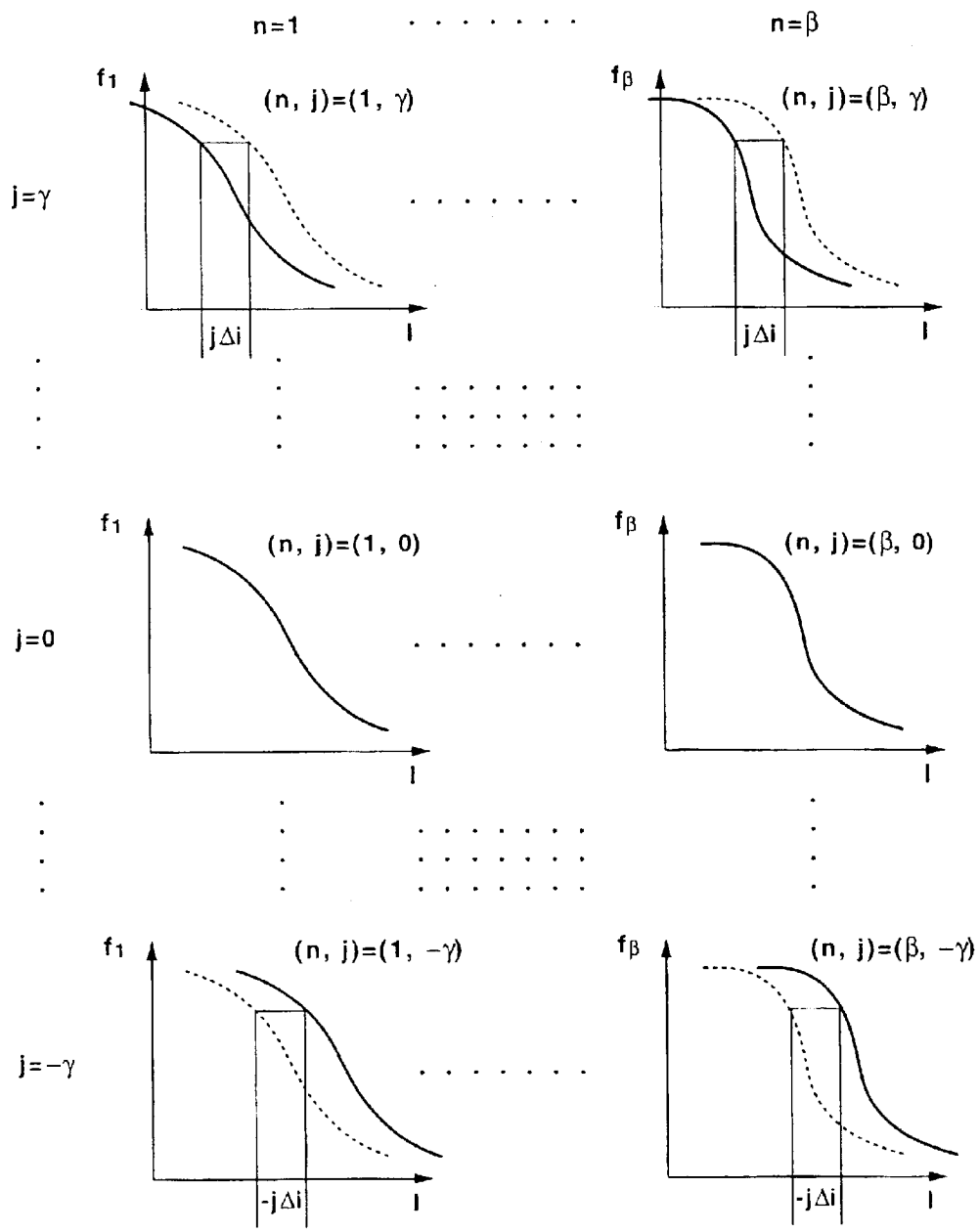
FIG. 3 is individual fundamental map views of fundamental maps and those for which current value corrections are carried out used in the corrective control unit shown in FIG. 1.

At steps 105 through 109, corrective control unit 3 at first calculates the map values fn (Ik+jΔi) in accordance with α number of current values Ik using preset n kinds of maps fn such as shown in FIG. 3. Then, corrective control unit 3 calculates the difference between actually measured output liquid pressure values Pk in accordance with each of current values Ik and the map value of fn (Ik+jΔi) and calculates and stores a sum value of the difference by α number of output pressure values (fit value). The sum is calculated by all of combinations of (n, j)=[(1, 2, ..., β), (-γ, ..., 0, ..., γ)] and n, j are determined which correspond to a least addition value (fittest map value and fittest offset current value). It is noted that, although fundamental maps stored in map storing section 30 are preset by n kinds (n=1 through β), the fundamental maps may be increased by means of a corrective term of jΔi which shifts the fundamental maps toward a current value direction (these are called semi fundamental maps) so that only a simple calculation processing permits the map characteristic comparison in the same case where the fundamental maps are preset further by j (j=-γ to +γ) kinds.

On the basis of (n, j) values determined at the steps described above, actually measured output liquid pressure values Pk based on each current value Ik are taken along the longitudinal axis and map values Fk {=fn(Ik+jΔi)} based on the current values Ik are plotted along the lateral axis. At step 108, the least square method is used to approximate the plotted points to the first-order function. Then, a gradient (coefficient or gain) a and a constant term (offset) b in the first-order function are determined.

Figure 5A:
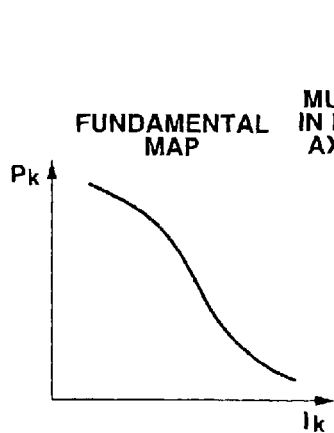
FIGS. 5A and 5B are graphs representing the fundamental map used in the corrective control unit shown in FIG. 1 and a corrected fundamental map corrected with corrective terms.
Figure 5B:
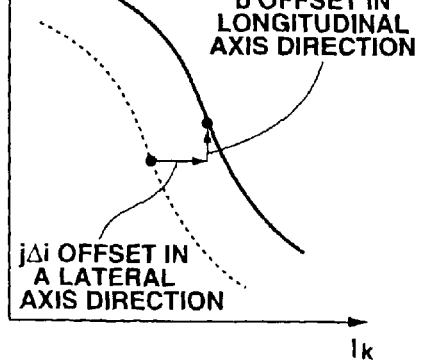

FIGS. 5A and 5B show explanatory graphs for explaining a calculation process of solenoid drive current Ik using the above-described parameters (n, j, a, b). For the selected fundamental map shown in FIG. 5A, an expansion of a times is carried out in the longitudinal axis (pressure value) direction, the offset by jΔi is carried out in the longitudinal axis (current value) direction, and the offset by b in the longitudinal axis direction is carried out. Thus, the modified fundamental map as shown in FIG. 5B is obtained and the longitudinal axis can be expressed as an output pressure demand value P*. It is noted that the above-described parameters (corrective terms) (n, j, a, b) are stored in storing section 12 of ATCU 1 shown in FIG. 1. During the actual vehicular run, correcting section 11 shown in FIG. 1 calculates solenoid drive current I with respect to output pressure demand value P* using these corrective terms and outputs the calculated result to solenoid drive circuit 21.

In the corrective control system in the embodiment, in the linear region of the hysteresis characteristic, the current average value between the current value in the first hysterissis loop and the current valve in the second hysterisis loop for each of the same output pressure values is calculated and, then, points S1 and S2 are set which are determined from the output pressure actually measured value and the current average value. Then, the first order function is introduced which passes the set two or more linear points. When a preset virtual output pressure Pe is substituted into the first-order function so that the virtual point Ie is calculated and virtual point (Pe, ie) is set. At this time, each point based on the output pressure actually measured value and current average value is set at the high output pressure side including the linear characteristic region of the hysteresis characteristic. The virtual point is set at the lower output liquid pressure side than the linear characteristic region of the hysterisis characteristic. The relationship between the approximation into the straight line of these set respective points is the fundamental map. Hence, with only the plurality of points stored as fundamental maps, the first-order function is approximated between these points so that the accurate corrective control can be achieved with easy calculation and with no requirement of the large memory capacity. Furthermore, since the virtual point is provided so that the linearity is assured even if the output pressure zero point on the first hysterisis loop is separated considerably from the output pressure zero point on the second hysterisis loop.

Then, if the corrective control system according to the present invention is applied to the control valve unit of the direct drive type automatic transmission equipped with the electromagnetic linear solenoid valve, an extremely highly accurate gear shift control can be achieved. It is noted that, in each of the first and second embodiments, after the correction of the current value outputted from correcting section 11 in accordance with the output pressure demand value P* described above is ended, corrective control unit 3 may be disconnected from ATCU 1 and control valve unit 2 and a control unit defined in the claims corresponds to, for example, automatic transmission control unit ATCU 1.

The entire contents of a Japanese Patent Application No. 2002-096394 (filed in Japan on Mar. 29, 2002) are herein incorporated by reference. The scope of the invention is defined with reference to the following claims.

What is claimed is:

1. A corrective control system for a liquid pressure control apparatus of a control valve unit, comprising:

a liquid pressure controlling section that controls an output liquid pressure of the control valve unit on the basis of a current value which is an electrical signal generated in accordance with an output pressure demand value P* determined according to a calculation process executed within a control unit;

an output liquid pressure actually measuring section that outputs respectively separated current values to a solenoid drive circuit of the control valve unit and actually measures the output liquid pressure values for the outputted respective current values;

an output pressure theoretical value calculating section that calculates an output liquid pressure theoretical value for each of the current values outputted by the actually measuring section by referring to preset fundamental maps, each fundamental map representing a relationship between the current value and the output liquid pressure theoretical value;

a corrective term calculating section that approximates a relationship between the output liquid pressure actually measured value and the output liquid pressure theoretical value for each of the same current values to a first-order function and calculates a coefficient of the approximated first-order function and a constant thereof;

a storing section that stores the calculated coefficient and constant therein; and a correcting section that corrects the electrical signal which accords with the output liquid pressure demand value on the basis of the coefficient and constant stored in the storing section;

a fundamental map presetting section that presets the fundamental maps on the basis of a hysterisis characteristic that each individual control valve unit has, the hysteresis characteristic being exhibited in such a manner that the output liquid pressure actually measured value which follows along a first hysteresis loop when the current value is increased toward a larger value is different from that which follows along a second hysterisis loop when the current value is, in turn, decreased toward a smaller value from the larger value;

a linear point setting section that calculates the current average values between the current values in the first hysteresis loop and those in the second hysterisis loop which correspond to at least two output liquid pressure actually measured values and sets linear points determined from the output liquid pressure actually measured value and the current average value which corresponds to the two output liquid pressure actually measured values in a linear region of the hysteresis characteristic; and a linearity characteristic deriving section that derives a first-order function that passes through the set two linear points, and wherein the fundamental map presetting section presets the fundamental maps using the relationship between the output liquid pressure actually measured value and the current average value and using the relationship on the derived first-order function at a lower output pressure side than the linear region.

2. A corrective control system for a liquid pressure control apparatus of a control valve unit as claimed in claim 1, wherein the linear point setting section sets two points $S1(i1, p1)$ and $S2(i2, p2)$ on a line of the average current value for each of the output liquid pressure actually measured values ($p1$ and $p2$) and the linearity characteristic deriving section drives the first-order function as follows: $(P-p1)=[(p2-p1)/(i2-i1)] \cdot (I-i1)$, wherein P denotes the output liquid pressure actually measured value and I denotes the average current value.

3. A corrective control system for a liquid pressure control apparatus of a control valve unit as claimed in claim 2, which further comprises a virtual point setting section that sets a virtual point (Pe, Ie) by substituting P=Pe having a negative value to the derived first-order function to calculate Ie: $Ie=i1+[(Pe-p1) \cdot (i2-i1)] \cdot (P2-p1)$.

4. A corrective control system for a liquid pressure control apparatus of a control valve unit as claimed in claim 3, wherein the fundamental map presetting section stores the fundamental maps in a form of point data (I. P) of the average current values at preset plurality of output liquid pressures and stores the virtual point (Pe, Ie).

5. A corrective control system for a liquid pressure control apparatus of a control valve unit as claimed in claim 4, wherein, when the control unit requests the data between the respective point data, control unit connects between the respective data points via a straight line to approximate the connecting line to a first-order function and inputs the output liquid pressure P to the approximated first-order function to obtain the average current value I.

6. A corrective control system for a liquid pressure control apparatus of a control valve unit as claimed in claim 1, wherein a controlled object of the liquid pressure controlling section is the control valve unit of a vehicular automatic transmission that supplies a clutch pressure to an engagement element by means of a plurality of clutch pressure supplying sections in accordance with a vehicular running state and wherein each of the clutch pressure supplying sections comprises an electromagnetic linear solenoid valve which is capable of modifying the clutch pressure which is the output liquid pressure in accordance with the current value.

7. A corrective control system for a liquid pressure control apparatus of a control valve unit, comprising:

a liquid pressure controlling section that controls an output liquid pressure of the control valve unit on the basis of a current value which is an electrical signal generated in accordance with an output pressure demand value P* determined according to a calculation process executed within a control unit;

an output liquid pressure actually measuring section that outputs respectively separated current values to a solenoid drive circuit of the control valve unit and actually measures the output liquid pressure values for the outputted respective current values;

an output pressure theoretical value calculating section that calculates an output liquid pressure theoretical value for each of the current values outputted by the actually measuring section by referring to preset fundamental maps, each fundamental map representing a relationship between the current value and the output liquid pressure theoretical value;

a corrective term calculating section that approximates a relationship between the output liquid pressure actually measured value and the output liquid pressure theoretical value for each of the same current values to a first-order function and calculates a coefficient of the approximated first-order function and a constant thereof;

a storing section that stores the calculated coefficient and constant therein; and a correcting section that corrects the electrical signal which accords with the output liquid pressure demand value on the basis of the coefficient and constant stored in the storing section;

a fundamental map presetting section that presets and stores the fundamental maps therein on the basis of a hysterisis characteristic that each individual control valve unit has, the hysterisis characteristic being exhibited in such a manner that the output liquid pressure actually measured value which follows along a first hysteresis loop when the current value is increased toward a larger value is different from that which follows along a second hysterisis loop when the current value is, in turn, decreased toward a smaller value from the larger value;

a linear point setting section that calculates the current average values between the current values in the first hysteresis loop and those in the second hysterisis loop which respectively correspond to present plurality of the output pressure actually measured values and sets linear points determined from the output liquid pressure actually measured values and the current average values, from the hysterisis characteristic;

a linearity characteristic deriving section that derives a first-order function passing through the set two or more linear points; and a virtual point setting section that calculates a virtual current value by substituting a preset virtual output liquid pressure equal to or below zero into the first-order function derived by the linearity characteristic deriving section and sets a virtual point determined from the virtual output liquid pressure and virtual current value, wherein, at a higher output liquid pressure region including the linear characteristic region of the hysteresis characteristic, each point is set by the point setting section and, at a lower output liquid pressure region than the linear characteristic region of the hysterisis characteristic, the point is set by the virtual point setting section, and wherein the fundamental map presetting section presets the fundamental maps, each fundamental map being a map representing that a relationship that mutually adjacent points are approximated by a straight line.

8. A corrective control method for a liquid pressure control apparatus of a control valve unit, comprising:

controlling an output liquid pressure of the control valve unit on the basis of a current value which is an electrical signal generated in accordance with an output pressure demand value P* determined according to a calculation process executed within a control unit;

outputting respectively separated current values to a solenoid drive circuit of the control valve unit;

actually measuring the output liquid pressure values for the outputted respective current values;

calculating an output liquid pressure theoretical value for each of the outputted current values by referring to preset fundamental maps, each fundamental map representing a relationship between the current value and the output liquid pressure theoretical value;

approximating a relationship between the output liquid pressure actually measured value and the output liquid pressure theoretical value for each of the same current values to a first-order function;

calculating a coefficient of the approximated first-order function and a constant thereof;

storing the calculated coefficient and constant therein; and correcting the electrical signal which accords with the output liquid pressure demand value on the basis of the stored coefficient and constant;

presetting the fundamental maps on the basis of a hysterisis characteristic that each individual control valve unit has, the hysteresis characteristic being exhibited in such a manner that the output liquid pressure actually measured value which follows along a first hysterisis loop when the current value is increased toward a larger value is different from that which follows along a second hysterisis loop when the current value is, in turn, decreased toward a smaller value from the larger value;

calculating the current average values between the current values in the first hysteresis loop and those in the second hysterisis loop which correspond to at least two output liquid pressure actually measured values;

setting linear points determined from the output liquid pressure actually measured value and the current average value which corresponds to the two output liquid pressure actually measured values in a linear region of the hysterisis characteristic; and deriving a first-order function that passes through the set two linear points, and wherein the fundamental maps are preset using the relationship between the output liquid pressure actually measured value and the current average value and using the relationship on the derived first-order function at a lower output pressure side than the linear region.

9. A corrective control method for a liquid pressure control apparatus of a control valve unit, comprising:

controlling an output liquid pressure of the control valve unit on the basis of a current value which is an electrical signal generated in accordance with an output pressure demand value P* determined according to a calculation process executed within a control unit;

outputting respectively separated current values to a solenoid drive circuit of the control valve unit;

actually measuring the output liquid pressure values for the outputted respective current values;

calculating an output liquid pressure theoretical value for each of the outputted current values by referring to preset fundamental maps, each fundamental map representing a relationship between the current value and the output liquid pressure theoretical value;

approximating a relationship between the output liquid pressure actually measured value and the output liquid pressure theoretical value for each of the same current values to a first-order function;

calculating a coefficient of the approximated first-order function and a constant thereof;

storing the calculated coefficient and constant therein; and correcting the electrical signal which accords with the output liquid pressure demand value on the basis of the stored coefficient and constant;

presetting and storing the fundamental maps therein on the basis of a hysterisis characteristic that each individual control valve unit has, the hysterisis characteristic being exhibited in such a manner that the output liquid pressure actually measured value which follows along a first hysterisis loop when the current value is increased toward a larger value is different from that which follows along a second hysterisis loop when the current value is, in turn, decreased toward a smaller value from the larger value;

calculating the current average values between the current values in the first hysterisis loop and those in the second hysterisis loop which respectively correspond to present plurality of the output pressure actually measured values and sets linear points determined from the output liquid pressure actually measured values and the current average values, from the hysterisis characteristic;

deriving a first-order function passing through the set two or more linear points; and calculating a virtual current value by substituting a preset virtual output liquid pressure equal to or below zero into the derived first-order function; and seting a virtual point determined from the virtual output liquid pressure and virtual current value, and wherein, at a higher output liquid pressure region including the linear characteristic region of the hysteresis characteristic, each point is set at the point setting and, at a lower output liquid pressure region than the linear characteristic region of the hysteresis characteristic, the point is set at the virtual point setting, and wherein the fundamental map presetting section presets the fundamental maps, each fundamental map being a map representing that a relationship that mutually adjacent points are approximated by a straight line.

10. A corrective control system for a liquid pressure control apparatus of a control valve unit, comprising:

liquid pressure controlling means for controlling an output liquid pressure of the control valve unit on the basis of a current value which is an electrical signal generated in accordance with an output pressure demand value P* determined according to a calculation process executed within a control unit;

output liquid pressure actually measuring means for outputting respectively separated current values to a solenoid drive circuit of the control valve unit and for actually measuring the output liquid pressure values for the outputted respective current values;

output pressure theoretical value calculating means for calculating an output liquid pressure theoretical value for each of the current values outputted by the actually measuring section by referring to preset fundamental maps, each fundamental map representing a relationship between the current value and the output liquid pressure theoretical value;

corrective term calculating means for approximating a relationship between the output liquid pressure actually measured value and the output liquid pressure theoretical value for each of the same current values to a first-order function and for calculating a coefficient of the approximated first-order function and a constant thereof;

storing means for storing the calculated coefficient and constant therein; and correcting means for correcting the electrical signal which accords with the output liquid pressure demand value on the basis of the coefficient and constant stored in the storing means;

fundamental map presetting means for presetting the fundamental maps on the basis of a hysterisis characteristic that each individual control valve unit has, the hysterisis characteristic being exhibited in such a manner that the output liquid pressure actually measured value which follows along a first hysterisis loop when the current value is increased toward a larger value is different from that which follows along a second hysteresis loop when the current value is, in turn, decreased toward a smaller value from the larger value;

linear point setting means for calculating the current average values between the current values in the first hysteresis loop and those in the second hysteresis loop which correspond to at least two output liquid pressure actually measured values and for setting linear points determined from the output liquid pressure actually measured value and the current average value which corresponds to the two output liquid pressure actually measured values in a linear region of the hysteresis characteristic; and linearity characteristic deriving means for deriving a first-order function that passes through the set two linear points, and wherein the fundamental map presetting means presets the fundamental maps using the relationship between the output liquid pressure actually measured value and the current average value and using the relationship on the derived first-order function at a lower output pressure side than the linear region.

* * * * *

UNITED STATES PATENT AND TRADEMARK OFFICE
CERTIFICATE OF CORRECTION

PATENT NO. : 6,779,540 B2 Page 1 of 1
DATED : August 24, 200
INVENTOR(S) : Shigeru Ishii et al.

It is certified that error appears in the above-identified patent and that said Letters Patent is hereby corrected as shown below:

<u>Title page,</u>
Item [75], Inventors, second inventor's name should read:
-- Masashi Sugiuchi --

Signed and Sealed this

Twenty-first Day of December, 2004

JON W. DUDAS
*Director of the United States Patent and Trademark Office*